(12) United States Patent
Ficco

(10) Patent No.: US 7,099,472 B2
(45) Date of Patent: Aug. 29, 2006

(54) METHOD AND APPARATUS FOR SECURING DIGITAL VIDEO RECORDING

(75) Inventor: Michael Ficco, Silverspring, MD (US)

(73) Assignee: The DirecTV Group, Inc., El Segundo, CA (US)

(*) Notice: Subject to any disclaimer, the term of this patent is extended or adjusted under 35 U.S.C. 154(b) by 650 days.

(21) Appl. No.: 09/729,010

(22) Filed: Dec. 4, 2000

(65) Prior Publication Data

US 2002/0067829 A1    Jun. 6, 2002

Related U.S. Application Data

(60) Provisional application No. 60/219,941, filed on Jul. 20, 2000.

(51) Int. Cl.
H04N 7/167 (2006.01)
H04N 7/16 (2006.01)

(52) U.S. Cl. .................... 380/201; 725/139
(58) Field of Classification Search ................ 380/203
See application file for complete search history.

(56) References Cited

U.S. PATENT DOCUMENTS

| | | | | |
|---|---|---|---|---|
| 3,944,745 A | * | 3/1976 | Gannett | 380/41 |
| 5,046,065 A | * | 9/1991 | Goertz | 370/402 |
| 5,177,786 A | * | 1/1993 | Kang | 380/216 |
| 5,208,853 A | * | 5/1993 | Armbruster et al. | 705/56 |
| 5,734,927 A | * | 3/1998 | Boutaud et al. | 710/60 |
| 5,796,828 A | * | 8/1998 | Tsukamoto et al. | 380/203 |
| 5,936,660 A | | 8/1999 | Gurantz | 348/10 |
| 6,028,934 A | * | 2/2000 | Shimosaka | 380/268 |
| 6,308,256 B1 | * | 10/2001 | Folmsbee | 712/209 |
| 6,795,931 B1 | * | 9/2004 | LaBerge | 713/401 |
| 6,810,387 B1 | * | 10/2004 | Yim | 705/57 |

OTHER PUBLICATIONS

Definiton of "interface" taken from www.dictionary.com on Apr. 27, 2005.*

* cited by examiner

*Primary Examiner*—Ayaz Sheikh
*Assistant Examiner*—Brandon Hoffman
(74) *Attorney, Agent, or Firm*—Georgann S. Grunebach

(57) ABSTRACT

An approach is provided for storing and retrieving digital audio/video data. A system bus of fixed width transfers data bits. The data bits form a bit pattern. An interface is coupled to system bus and is configured to alter the bit pattern of the data bits, according to a prescribed scheme. A hard disk drive is coupled to the interface and is configured to store the altered data bits. The approach has particular applicability to a digital set-top box for a direct satellite television system.

18 Claims, 8 Drawing Sheets

METHOD AND APPARATUS FOR SECURING DIGITAL VIDEO RECORDING

CROSS-REFERENCES TO RELATED APPLICATION

This application is related to, and claims the benefit of the earlier filing date of, U.S. Provisional Patent Application 60/219,941 filed Jul. 20, 2000, entitled "Simple Method of Securing Digital Video Recording," the entirety of which is incorporated herein by reference.

BACKGROUND OF THE INVENTION

1. Field of the Invention

The present invention relates to a digital communication system, and is more particularly related to protection of Digital Video Recording (DVR) content.

2. Discussion of the Background

Direct television broadcasting systems provide the consumers with high quality video and audio signals. Set-top based Digital Video Recording (DVR) to a hard disk is emerging as a needed feature in the highly competitive consumer electronics industry. With advances in digital recording and storage technologies, there is concern over unauthorized copying of the broadcast content.

The technology exists today to allow consumers to make a perfect and permanent personal digital copy of their favorite movie, for example. This capability to create high quality reproductions is recognized by the industry and consumers alike as a distinguishing product feature. However, because perfect digital copies can be readily made, content providers may be reluctant to supply programming to set-top boxes that incorporate unrestricted digital video recording. Thus, a potential near term impediment to the success of such a set-top box is the lack of an established mechanism to cost effectively prevent unauthorized reproduction of programming content. That is, content providers could be reluctant to support a set-top box that may lead to potential abuse of their material by the general consumers.

A number of scenarios exist whereby the consumer can distribute and replay the programming content of the set-top box. One approach would be as follows. A consumer records on a DVR enabled set-top certain content that is to be shared. Next, the consumer removes the hard drive from the set-top and installs the hard drive as a secondary drive in a PC. Thereafter, the consumer extracts content from the hard drive and posts the content on a web site in a format that is suitable for sharing.

Correspondingly, a consumer may find programming of interest on a web site. To view the content, the user installs a second hard drive in a PC. That is, the new second hard drive is in addition to the drive that is used to boot the PC and will be used for storing the digital content. Next, the user acquires and installs on the PC special software to format the new hard drive so that it is compatible with the set-top box. The user then captures the desired content to some PC storage (that is not the newly created set-top compatible disk), for example, downloading from the Internet. Special conversion software is then excuted to convert the digital video distribution image into a format compatible with the set-top box. Thereafter, the converted image is written to the new hard drive. The new hard drive is then removed from the PC and installed in the set-top box.

In addition to digital set-tops, a common DVD player may be used to share pirated content. Recordable DVD media and DVD recording devices will become sufficiently economical that the average consumer can obtain them for copying of programming content. If the source of the pirated content were a digital set-top, a conversion utility would be required to convert the digital formatted data that are stored on the set-top hard drive to that of the DVDs. The audio analogy of such a utility is a CD "ripper", which permits a user to extract music tracks from a CD for storage on the computer or MP3 player. Given suitable source material and appropriate "video ripper" software, it is reasonable to assume that the DVD-R may become an important method of distributing pirated digital video.

Another obvious playback platform is the PC. Any PC with a broadband Internet connection is well positioned to acquire the digital video content. Assuming the PC in question has a DVD player and a DVD-R writer, it would be straightforward for the user to acquire or copy a digital movie and write it to a DVD-R. The owner of such a PC could, with relative ease, build a substantial library of DVD-R digital video movies. Pirate DVDs borrowed from friends could easily be copied and the broadband Internet connection would offer access to a wealth of digital video. It is reasonable to assume that pirates first, then legitimate companies will emerge to provide web portals for downloading digital video.

Understandably, content providers are apprehensive about the ability to maintain control of their product to avoid theft or misuse, which undercut profitability. If the content providers become too uneasy about possible compromise of their product, they may withhold programming and be disinclined from developing additional programming. Hence, any DVR product or mechanism that is endorsed, for example, by a subscription movie service (e.g., DIRECTV©) must provide reasonable assurances to the content providers that the content will not be used in a fashion that is objectionable.

Therefore, it is clear that some form of security is needed to protect the programming content in a fashion that is acceptable to the content providers. Lack of industry consensus on suitable DVR content protection mechanisms can hamper mass-market success of the digital set-top box. The approach should prevent, or significantly hinder, an individual or small group of interested people from reverse engineering the DVR design to gain an unsecured copy of the content. Additionally, the approach should prevent the distribution of a "solution" that allows a large number of people to gain a personal copy of the DVR content.

A number of content protection methodologies have emerged, particularly with respect to security techniques in the disk drives. Disk drive manufacturers offer a variety of security techniques, such as the use of hidden sectors, restricted sectors, and encryption. Under the hidden sectors approach, various sectors of the hard disk drive that contain DVR content would not be visible to a personal computer (PC) running standard software. A drawback with this approach is that it is not particularly secure. A sufficiently knowledgeable consumer could monitor the disk drive interface of the set-top box and reverse engineer the hidden sectors. This knowledgeable consumer could then write custom PC software to make the hidden sectors visible to the PC. Such custom software would make the disks with hidden sectors roughly equivalent to those with normal sectors. This custom software may then be widely disseminated; for example, through the Internet.

Another approach is to restrict access to the sectors of the hard disk that contains the programing content. This mechanism does not permit the restricted sectors to be accessed without a suitable password, even though the sectors are visible. However, such an arrangement has the same drawback as that of the hidden sector protection mechanism, in that a sufficiently knowledgeable person can monitor the disk drive interface and capture the password, and accordingly, write custom PC software to provide the password when needed.

Some disk drive manufactures offer data encryption as the data is written to the disk and decryption as it is retrieved. Several variations of this concept exist, depending on the particular manufacturer. Approaches that provide the decrypt key in the clear suffer from the same problem previously discussed. That is, a sufficiently knowledgeable person can monitor the disk drive interface and capture the decryption key. This could be enhanced with public/private key encryption, but would require tight coupling between the disk drive manufacturer and the set-top manufacturer (not to mention increased per unit cost of the set-top boxes). The security of this approach depends more on the two manufacturers' ability to generate and manage unique disk drive/set-top key pairs than on the strength of the encryption. The tight coupling between keys in the set-top and drive dramatically complicates warranty repairs and other field support issues. Furthermore, both the encryption and decryption processes introduce latency in the recording and replaying of the content.

Based on the foregoing, there is a clear need for improved approaches to providing a Digital Video Recording (DVR) content protection mechanism.

There is also a need to provide a simple protection mechanism

There is a further need to supply a cost effective solution.

Therefore, an approach for preventing unauthorized copying of digital data is highly desirable.

SUMMARY OF THE INVENTION

According to one aspect of the invention, a method is provided for storing and retrieving digital data within a hardware platform The method includes receiving data bits across a bus of a fixed width; the data bits form a bit pattern. In addition, the method encompasses altering the bit pattern of the data bits according to a prescribed scheme. Further, the method includes storing the altered data bits, restoring the altered data bit pattern, and outputting the restored data bits. This approach advantageously inhibits unauthorized copying of digital content.

According to another aspect of the invention, an apparatus for storing and retrieving digital video data comprises a system bus that is configured to transfer data bits of a fixed width. The data bits form a bit pattern. An interface is coupled to system bus and is configured to alter the bit pattern of the data bits according to a prescribed scheme. A hard disk drive is coupled to the interface and is configured to store the altered data bits. The above arrangement advantageously provides a simple and cost effective content security scheme.

According to another aspect of the invention, a system for storing and retrieving digital audio/video data comprises a satellite antenna that is configured to receive audio/video signals. A set-top box is coupled to the satellite antenna; the set-top box includes a receiver configured to output data bits corresponding to the received audio/video signals. A fixed width bus is coupled to the receiver and is configured to transfer data bits. The data bits form a bit pattern. An interface is coupled to the bus and is configured to alter the bit pattern of the data bits according to a prescribed scheme. A hard disk drive is coupled to the interface and is configured to store the altered data bits. The above arrangement advantageously provides a readily deployable protection mechanism In yet another aspect of the invention, a computer-readable medium carrying one or more sequences of one or more instructions for storing and retrieving digital video data within a hardware platform is disclosed. The one or more sequences of one or more instructions include instructions which, when executed by one or more processors, cause the one or more processors to perform the step of receiving data bits across a bus of a fixed width, wherein the data bits form a bit pattern. Another step includes altering the bit pattern of the data bits according to a prescribed scheme. Other steps include storing the altered data bits, restoring the altered data bits to the bit pattern, and outputting the restored data bits. This approach advantageously eliminates the use of costly encryption hardware.

In yet another aspect of the invention, an apparatus for storing and retrieving digital video data within a hardware platform comprises a means for receiving data bits across of a bus of a fixed width. The data bits form a bit pattern. The apparatus also includes a means for altering the bit pattern of the data bits according to a prescribed scheme. Further, the apparatus includes a means for storing the altered data bits, a means for restoring the altered data bits to the bit pattern, and a means for outputting the restored data bits. Accordingly, the above approach advantageously provides a cost effective security mechanism.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

In the following description, for the purpose of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

The present invention provides a system for storing and retrieving digital video data. The system includes a satellite antenna that receives video signals. A set-top box is coupled to the satellite antenna. The set-top box includes a receiver that outputs data bits corresponding to the received video signals. The data bits are applied to a parallel bus of a fixed width and form a bit pattern. An interface is coupled to the bus and alters the bit pattern of the data bits according to a prescribed scheme. The altered data bits are also of the same fixed width as the original data bits. A hard disk drive is coupled to the interface and stores the altered data bits. The above system provides a simple, cost effective approach to protecting the content of the set-top box from unauthorized copying.

Figure 1:
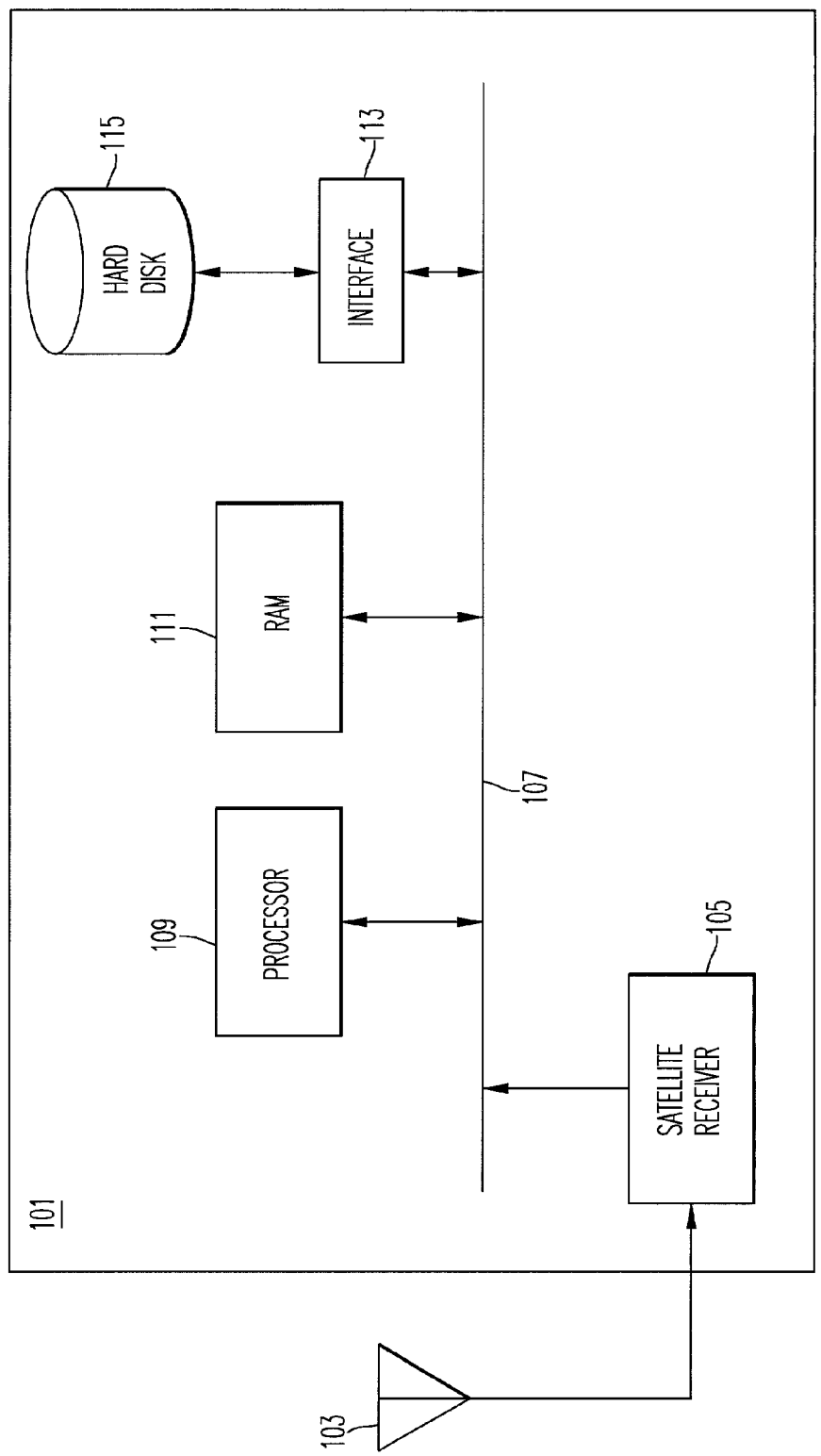
FIG. 1 is a digital set-top box of a direct satellite television broadcast system capable of employing a Digital Video Recording (DVR) content protection mechanism, according to an embodiment of the present invention.

FIG. 1 shows a digital set-top box of a direct satellite television broadcast system capable of employing a Digital Video Recording (DVR) content protection mechanism, according to an embodiment of the present invention. A set-top box 101 couples to a satellite antenna 103, which, in an exemplary embodiment, is a parabolic dish antenna. The set-top box 101 includes a satellite receiver 105 that demodulates the video signals from the antenna 103 and converts these video signals into digital data. The data bits are placed onto a system bus 107, which enables the transfer of the data bits among various components of the set-top box 101. These components include among others, a processor 109, a random access memory (RAM) 111, an interface 113, and a hard disk 115.

The interface 113, according to one embodiment, is situated between the hard disk 115 and the system bus 107. It should be noted that the interface 113 can be employed anywhere along the data path of the set-top box. The storing and retrieving process involves moving a specific number of bits at a time. This specific number of bits is fixed by the hardware platform and is referred to as the "width" of the data path In their native (unscrambled) form, the bits form a specific pattern that digitally represent the content being stored. As will be explained more fully below, the interface 113 alters the data bits from the system bus 107 for storage into and retrieval from the hard disk 115. The interface 113 inverts and/or scrambles bits on the bus according to a prescribed scheme, which, in one embodiment of the present invention, is unique to the set-top box. Inverting and/or scrambling of the data bits in this fashion offers some protection of the content and can be achieved in a timely fashion by more economical hardware than other forms of security or encryption. According to one embodiment of the present invention, system bus 107 is a parallel bus; alternatively, bus 107 may be a serial bus.

As will be explained in greater detail below, standard (unencrypted) data is written to the interface 113 where the bits are inverted and/or scrambled into a particular pattern. The data is then recorded on the disk in this altered form The security technique is symmetrical. When the data is played back through the same interface, the data is unscrambled and/or uninverted and returned to its normal correct ordering and sense.

The scrambling pattern (i.e., scheme), according to one embodiment of the present invention, can be unique to an individual set-top box. In other words, every set-top box is produced with a pattern that is not used by any other set-top box.

Alternatively, the scrambling pattern may be "relatively" unique; it is relative in the sense that not each and every set-top box utilizes a unique prescribed scheme; however, there are enough unique combination of patterns so that there is very low probability that an advertised security "hack" would work on any given customer's set-top. By way of example, one approach to achieving this would be to base the pattern of bit scrambling and/or inverting on the serial number of the set-top. Scrambling and/or inverting could also be determined from a random number, specific seeds ("keys"), or some other method. Inclusion of the interface 113 will serve to deter most hackers from making unauthorized copies of the programming content. Further, because the scrambling is unique to each set-top box, one "hacked" set-top will not likely assist in the hacking of other set-top boxes.

The DVR protection mechanism advantageously introduces very little delay in writing and reading the digital data. This advantage is especially important in the processing of high speed video data, in which a delay or latency introduced by data encryption could adversely affect the performance of the system.

Although the protection mechanism is described with respect to a Digital Video Recording (DVR) system, one of ordinary skill in the art would recognize that other applications exist for such a protection mechanism, in which low level of security is needed for storing and transferring digital data.

Figure 2:
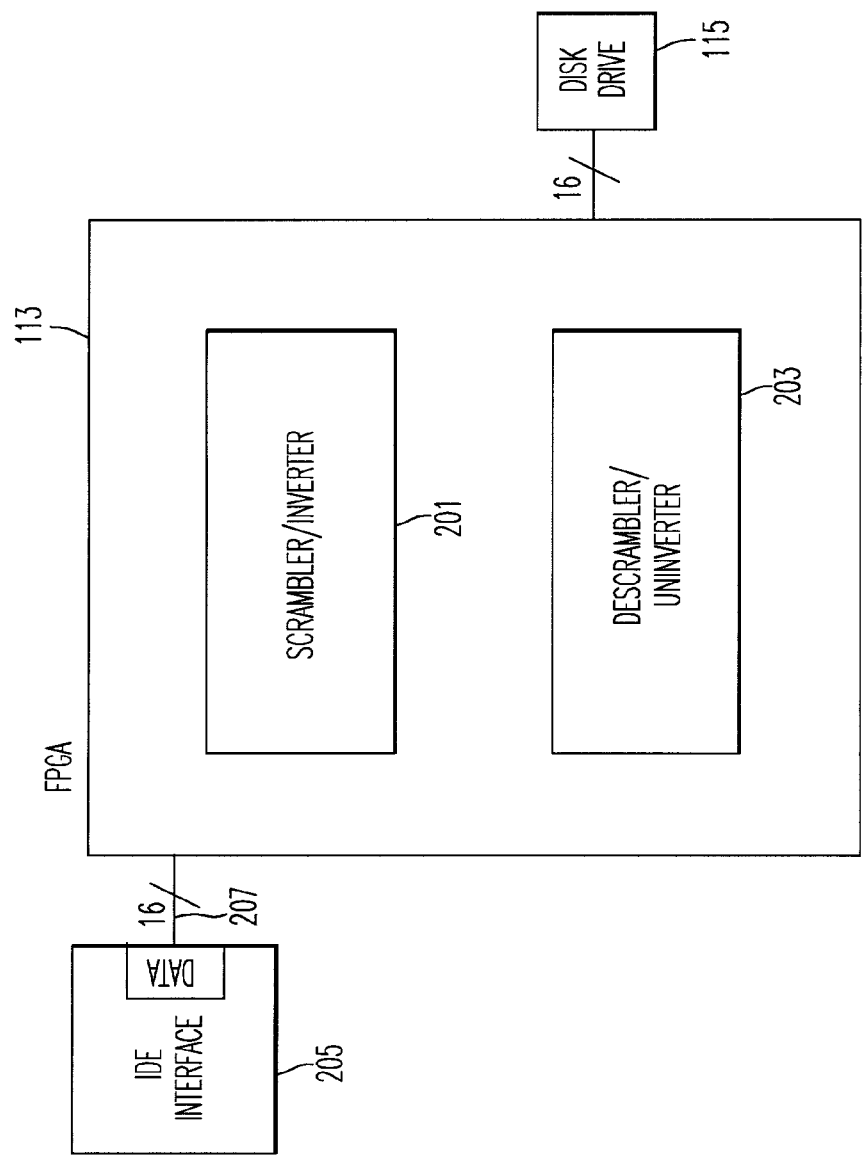
FIG. 2 is a diagram of one implementation of the interface to the hard disk, 113, of the set-top box of FIG. 1.

FIG. 2 shows the DVR protection interface of the digital set-top box of FIG. 1. In this exemplary embodiment, interface 113 includes a scrambler/inverter 201 and a descrambler/uninverter 203 within a single field programmable gate array (FPGA). One of ordinary skill in the art would recognize that other embodiments exist; e.g., an ASIC, discrete logic, or software. By way of example, FIG. 2 shows an exemplary embodiment of a protection mechanism of a simple, low data latency approach for securing digital video recorded to an IDE (Integrated Device Electronics) hard drive. It is recognized by one of ordinary skill in the art that the implementation could be generalized to other forms of hard drive; e.g., SCSI (Small Computer System Interface). The SCSI and IDE interfaces are detailed in Schmit, "The SCSI Bus and IDE Interface: Protocols, Applications and Programming" Addison-Wesley Pub. Co, 1997; which is incorporated herein by reference. Interface 113 receives data bits, which are 16 bits in width, from an IDE interface 205 over data path 207, and outputs scrambled and inverted data bits (which are the same width as the original data bits) to the disk drive 115. The scrambling and de-scrambling operations of the set-top box 101 are described below in FIGS. 3a and 3b.

Figure 3A:
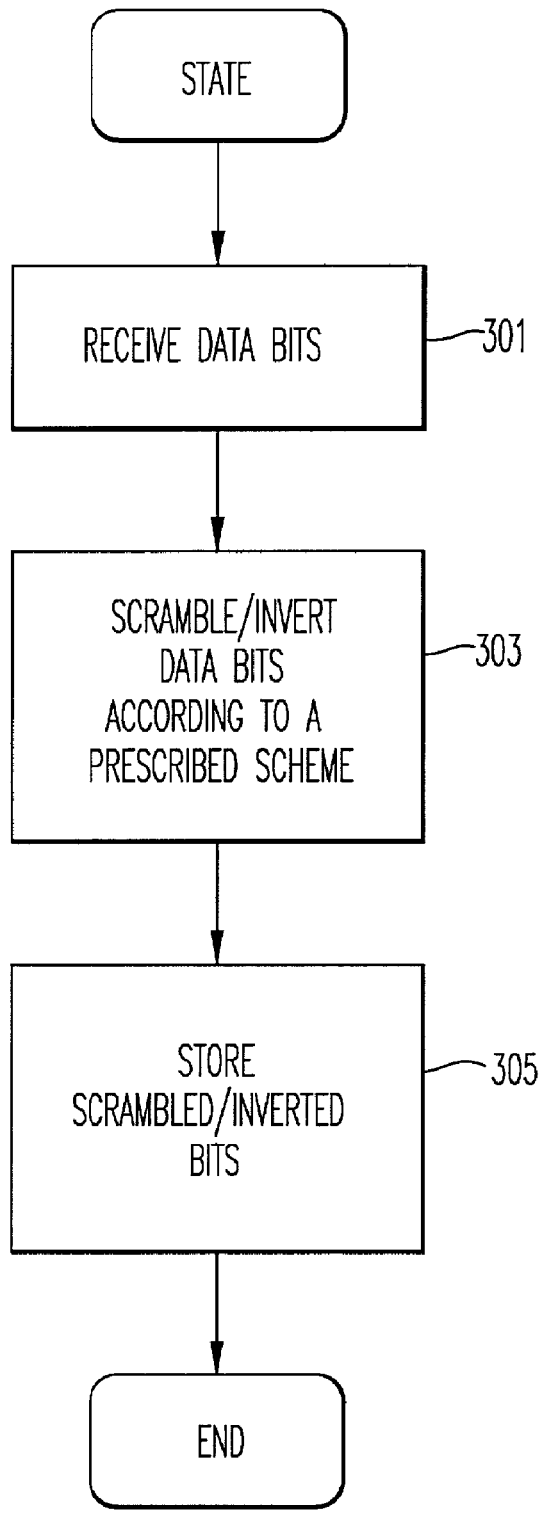
FIGS. 3a and 3b are flowcharts of the scrambling process and de-scrambling process, respectively, in accordance with an embodiment of the present invention.
Figure 3B:
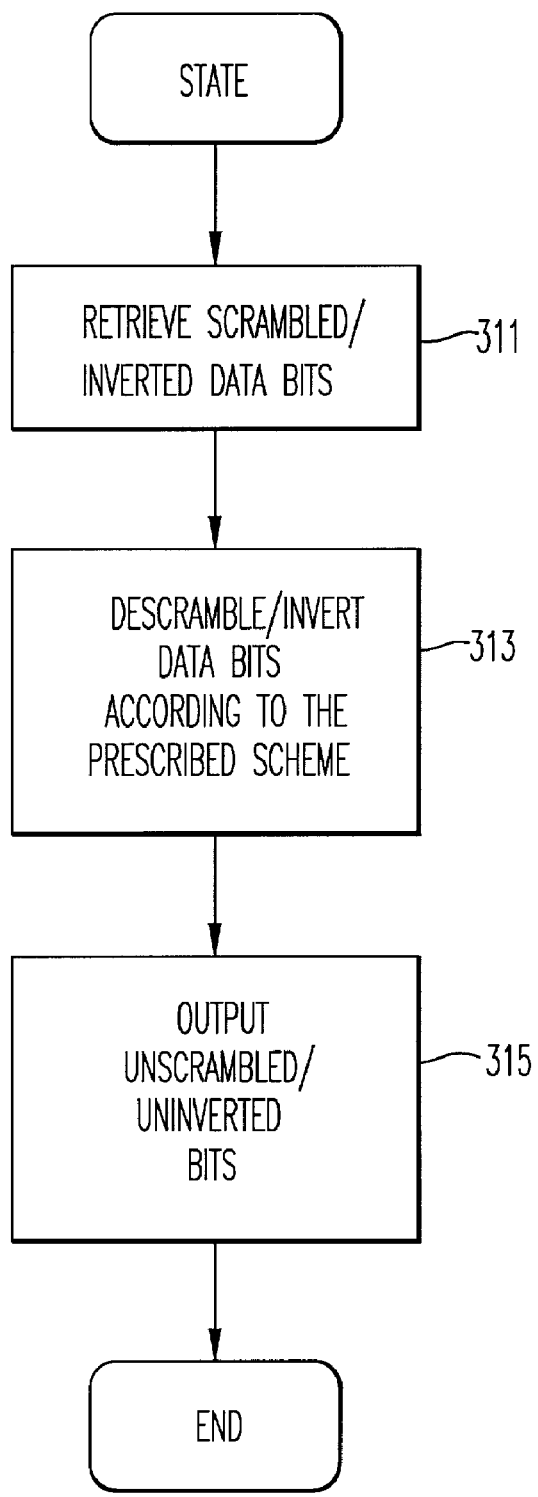

FIGS. 3a and 3b show flowcharts of the scrambling process and de-scrambling process, respectively, in accordance with an embodiment of the present invention. Specifically, in step 301 of FIG. 3a, the data bits are received from the satellite antenna 103 and transferred to the interface 113. Next, the interface 113 scrambles and/or inverts the data received signal, as in step 303, according to a prescribed scheme. Thereafter, the altered data bits are stored in the hard disk 115, per step 305.

To obtain the stored data bits, the interface 113 retrieves the scrambled and/or inverted data bits, as in step 311. The interface 113 then unscrambles and/or uninverts the data bits, as in step 313, according to the prescribed scheme, and outputs the restored data bits (step 315).

Figure 4:
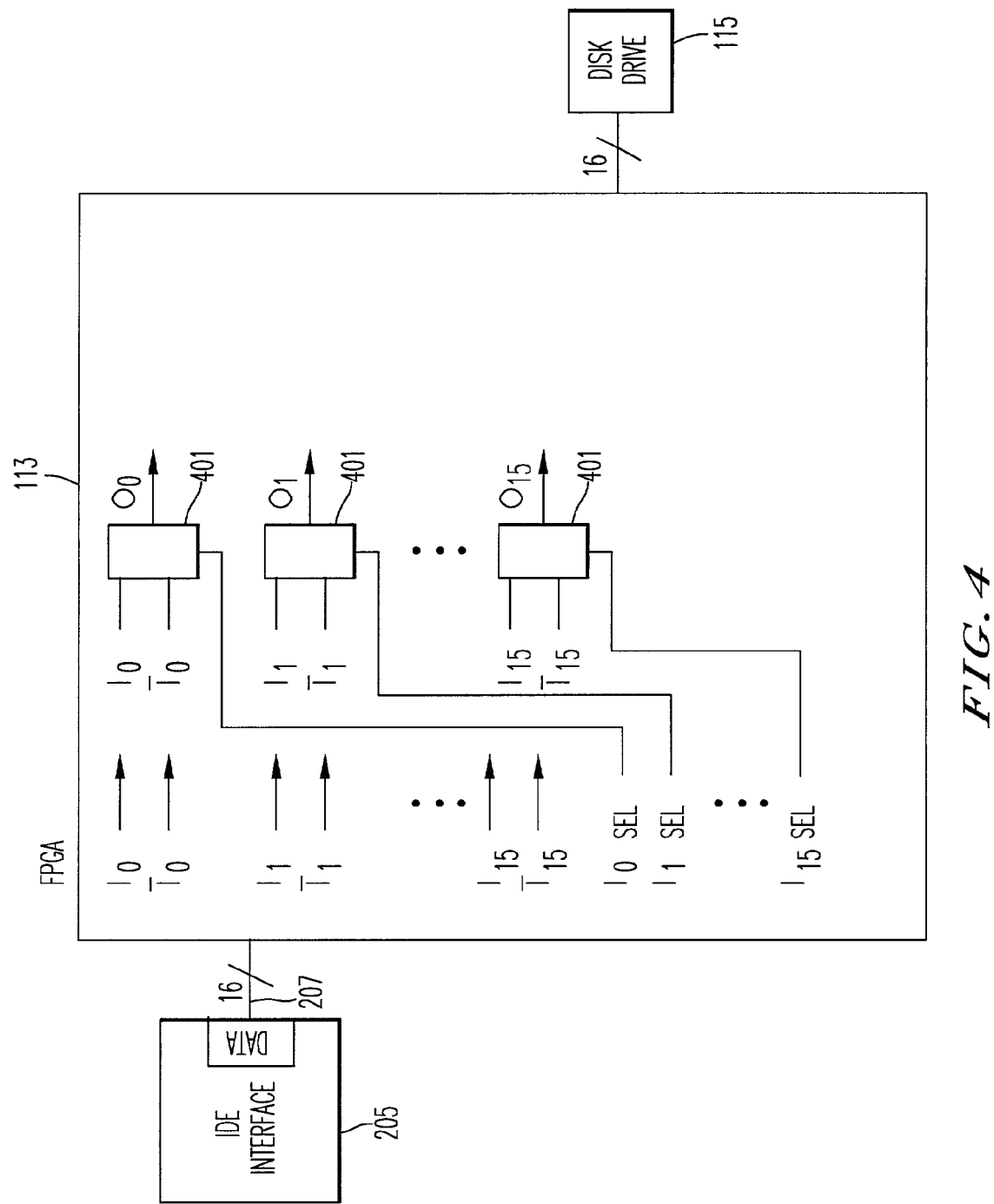
FIG. 4 is a diagram of one implementation of the DVR content protection mechanism utilizing bit inversion, according to an embodiment of the present invention.

FIG. 4 is a diagram of the DVR content protection mechanism utilizing bit inversion, according to an embodiment of the present invention. For the sake of clarity, only the inverter logic is shown. An IDE interface 205 is coupled to interface 113, which is a FPGA. Because the data path 207 of the IDE interface is 16 bits wide, the FPGA 113 utilizes 16 select lines, $I_0$ SEL, $I_1$ SEL, . . . , and $I_{15}$ SEL, to select either the data bit or its inversion. The select lines, $I_0$ SEL, $I_1$ SEL. . . . , and $I_{15}$ SEL, control the corresponding multiplexers 401 to output the selected data bit pattern, $O_0$, $O_1$, . . . and $O_{15}$. The output from interface 113 is then stored in disk drive 115. Upon retrieval of the scrambled and/or inverted data from disk drive 115, the interface 113 performs a reverse operation to "uninvert" the stored data, via an uninverter logic (not shown). As previously mentioned, from an implementation perspective, uninverting entails inverting the data bits again. Under this embodiment, $2^{16}-1$ different combinations of inverted or non-inverted data signals exist.

Figure 5:
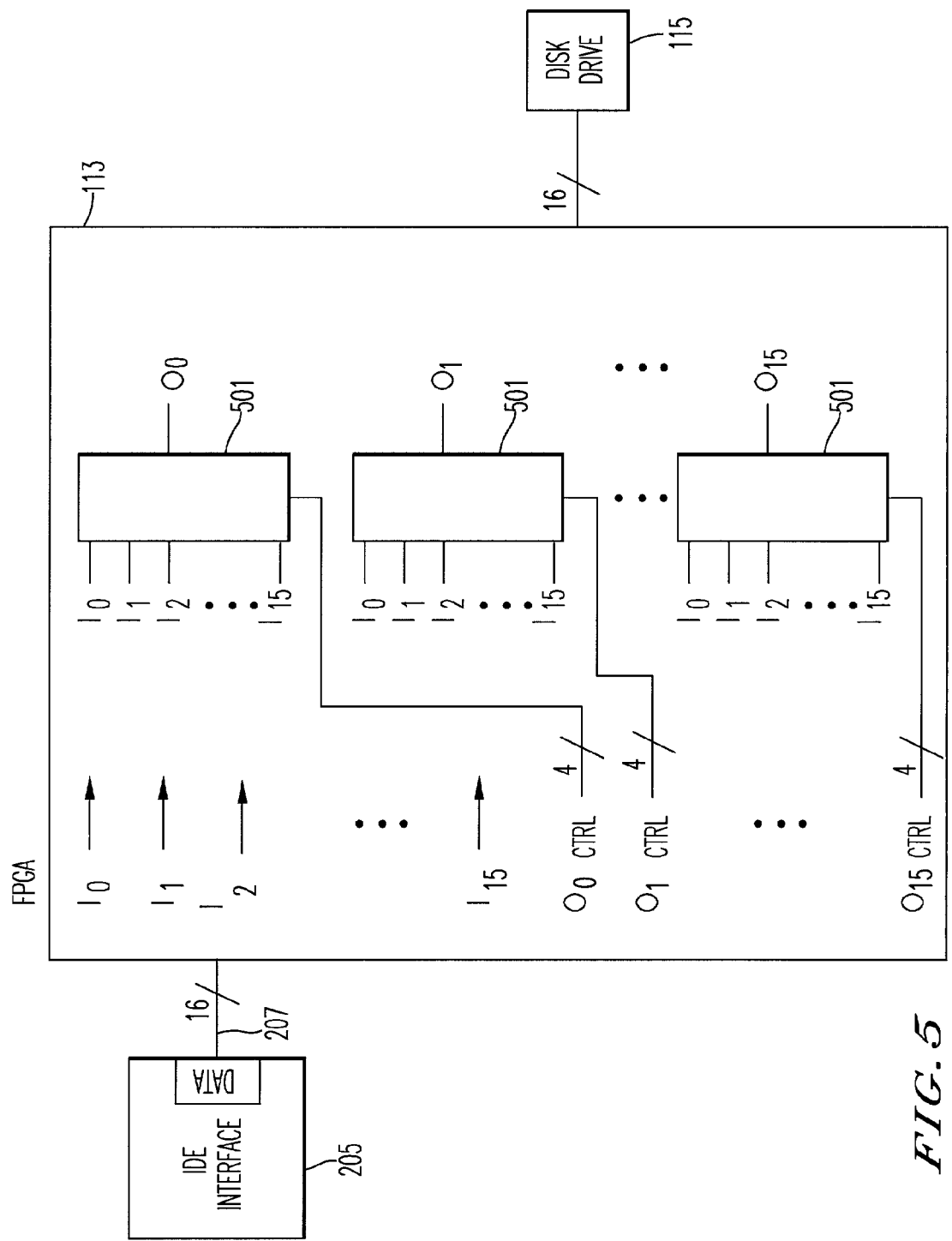
FIG. 5 is a diagram of one implementation of the DVR content protection mechanism utilizing bit scrambling, according to an embodiment of the present invention.

FIG. 5 is a diagram of the DVR content protection mechanism utilizing bit scrambling, according to an embodiment of the present invention. For purposes of explanation, only the scrambling logic is shown and described herein; it is recognized that the descrambling logic (not shown) performs the steps of restoring the data bits to the original bit pattern. As with the system of FIG. 4, this embodiment could be generalized to other forms of hard drives (e.g., SCSI). As in the system of FIG. 4, a standard IDE disk drive interface 205 outputs to a data path 207 that is 16 bits wide. A FPGA, 113, utilizes 16 multiplexers 501; each of the multiplexers 501 has 16 inputs, $I_0$, $I_1$. . . , and $I_{15}$, and outputs a corresponding output bit, $O_N$, in response to a control signal, $O_N$ CTRL. This arrangement provides nearly 16! (over 20 trillion) different useable combinations of data signals.

Figure 6:
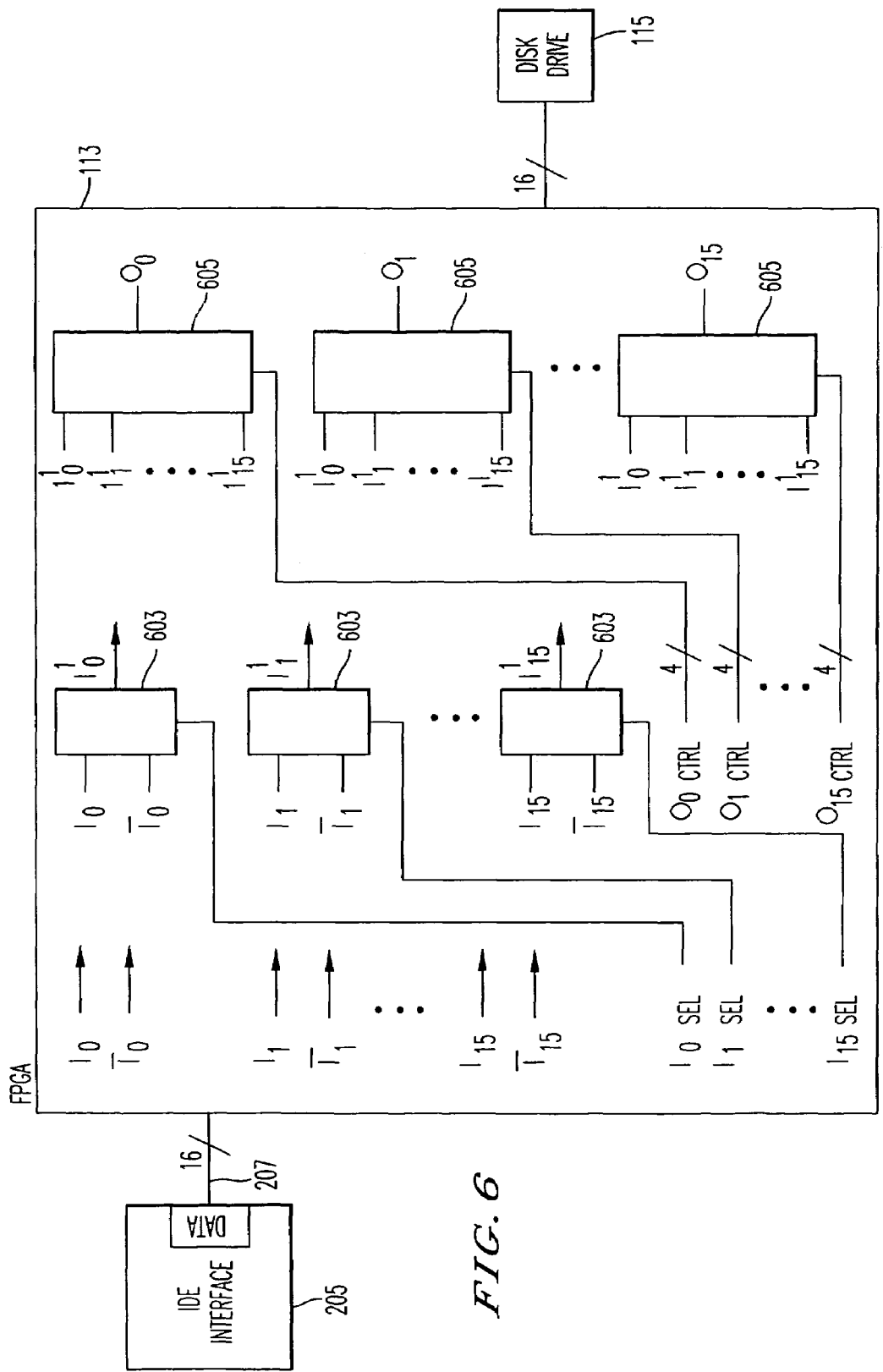
FIG. 6 is a diagram of one implementation of the DVR content protection mechanism utilizing bit inversion and scrambling, according to an embodiment of the present invention.

FIG. 6 is a diagram of the DVR content protection mechanism utilizing bit inversion and scrambling, according to an embodiment of the present invention. This embodiment of the present invention employs a combination of bit inversion and scrambling; only the scrambler/inverter logic is shown. The data bits that are output from IDE interface 205 enter FPGA 113 via data path 207. These data bits are first inverted according to a prescribed scheme using multiplexers 603, which are controlled by the respective select lines, $I_0$ SEL, $I_1$ SEL, . . . , and $I_{15}$ SEL. Thereafter, these inverted data bits are scrambled using multiplexers 605. Multiplexers 605 are controlled by corresponding control signals, $O_0$ CTRL, $O_1$ CTRL, . . . , $O_{15}$ CTRL. This FPGA 113 yields $16!*2^{16}$ different combinations of data signals. A descrambler/uninverter logic (not shown) converts the stored data resident within the hard disk drive 115. Although the interface 113 is described as performing inversion and subsequently scrambling, in the alternative, scrambling can be executed prior to inversion.

Figure 7:
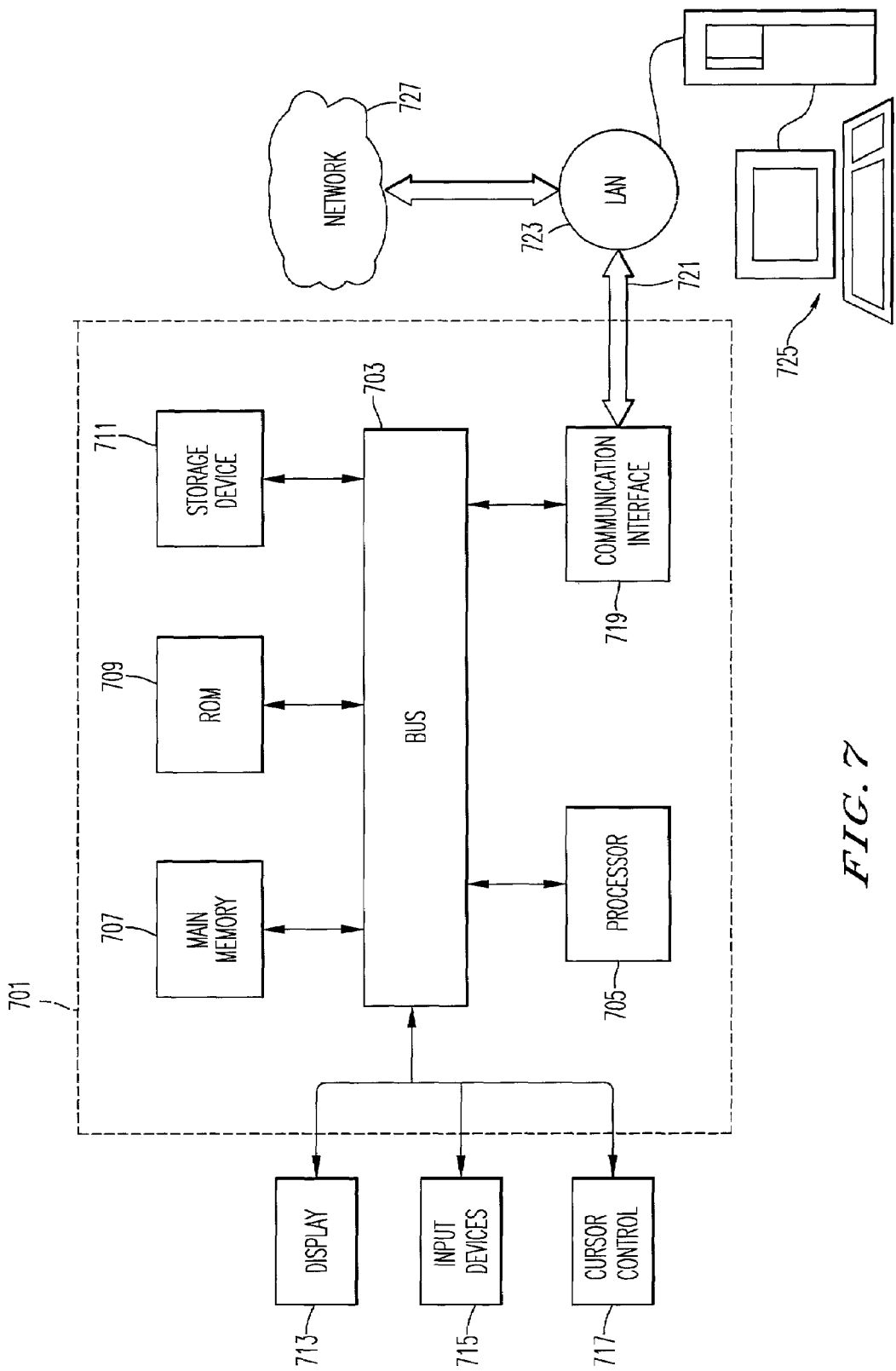
FIG. 7 is a diagram of a computer system that can perform the DVR content protection mechanism, in accordance with an embodiment of the present invention.

FIG. 7 is a diagram of a computer system that can perform the DVR protection mechanism, in accordance with an embodiment of the present invention. Computer system 701 includes a bus 703 or other communication mechanism for communicating information, and a processor 705 coupled with bus 703 for processing the information. Computer system 701 also includes a main memory 707, such as a random access memory (RAM) or other dynamic storage device, coupled to bus 703 for storing information and instructions to be executed by processor 705. In addition, main memory 707 may be used for storing temporary variables or other intermediate information during execution of instructions to be executed by processor 705. Computer system 701 further includes a read only memory (ROM) 709 or other static storage device coupled to bus 703 for storing static information and instructions for processor 705. A storage device 711, such as a magnetic disk or optical disk, is provided and coupled to bus 703 for storing information and instructions.

Computer system 701 may be coupled via bus 703 to a display 713, such as a cathode ray tube (CRT), for displaying information to a computer user. An input device 715, including alphanumeric and other keys, is coupled to bus 703 for communicating information and command selections to processor 705. Another type of user input device is cursor control 717, such as a mouse, a trackball, or cursor direction keys for communicating direction information and command selections to processor 705 and for controlling cursor movement on display 713.

According to one embodiment, scrambling and inversion of the data bits are provided by computer system 701 in response to processor 705 executing one or more sequences of one or more instructions contained in main memory 707. Such instructions may be read into main memory 707 from another computer-readable medium, such as storage device 711. Execution of the sequences of instructions contained in main memory 707 causes processor 705 to perform the process steps described herein. One or more processors in a multi-processing arrangement may also be employed to execute the sequences of instructions contained in main memory 707. In alternative embodiments, hard-wired circuitry may be used in place of or in combination with software instructions. Thus, embodiments are not limited to any specific combination of hardware circuitry and software.

Further, the instructions to perform the functions of the interface 113 (FIG. 2) may reside on a computer-readable medium. The term "computer-readable medium" as used herein refers to any medium that participates in providing instructions to processor 705 for execution. Such a medium may take many forms, including but not limited to, non-volatile media, violatile media, and transmission media. Non-volatile media includes, for example, optical or magnetic disks, such as storage device 711. Volatile media includes dynamic memory, such as main memory 707. Transmission media includes coaxial cables, copper wire and fiber optics, including the wires that comprise bus 703. Transmission media can also take the form of acoustic or light waves, such as those generated during radio wave and infrared data communication.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 705 for execution. For example, the instructions may initially be carried on a magnetic disk of a remote computer. The remote computer can load the instructions relating to the generation of the physical layer header remotely into its dynamic memory and send the instructions over a telephone line using a modem. A modem local to computer system 701 can receive the data on the telephone line and use an infrared transmitter to convert the data to an infrared signal. An infrared detector coupled to bus 703 can receive the data carried in the infrared signal and place the data on bus 703. Bus 703 carries the data to main memory 707, from which processor 705 retrieves and executes the instructions. The instructions received by main memory 707 may optionally be stored on storage device 711 either before or after execution by processor 705.

Computer system 701 also includes a communication interface 719 coupled to bus 703. Communication interface 719 provides a two-way data communication coupling to a network link 721 that is connected to a local network 723. For example, communication interface 719 may be a network interface card to attach to any packet switched local area network (LAN). As another example, communication interface 719 may be an asymmetrical digital subscriber line (ADSL) card, an integrated services digital network (ISDN) card or a modem to provide a data communication connection to a corresponding type of telephone line. Wireless links may also be implemented. In any such implementation, communication interface 719 sends and receives electrical, electromagnetic or optical signals that carry digital data streams representing various types of information.

Network link 721 typically provides data communication through one or more networks to other data devices. For example, network link 721 may provide a connection through local network 723 to a host computer 725 or to data equipment operated by a service provider, which provides data communication services through a communication network 727 (e.g., the Internet). LAN 723 and network 727 both use electrical, electromagnetic or optical signals that carry digital data streams. The signals through the various networks and the signals on network link 721 and through communication interface 719, which carry the digital data to and from computer system 701, are exemplary forms of carrier waves transporting the information. Computer system 701 can transmit notifications and receive data, including program code, through the network(s), network link 721 and communication interface 719.

The techniques described herein provide several advantages over prior approaches to store and retrieve digital data. A system bus transfers data bits of a fixed width. An interface is coupled to the system bus and is configured to alter the bit pattern of the data bits according to a prescribed scheme. A hard disk drive couples to the interface and stores the altered data bits. This approach advantageously ensures a level of security that will cost effectively deter most consumers from making unauthorized copies.

Obviously, numerous modifications and variations of the present invention are possible in light of the above teachings. It is therefore to be understood that within the scope of the appended claims, the invention may be practiced otherwise than as specifically described herein.

What is claimed is:

1. An apparatus for storing and retrieving digital video data, comprising:

An interface couple to a system bus and configured to receive from the system bus a plurality of data bits arranged in a data bit pattern;

A plurality of multiplexers, each configured to receive from the interface an associated one of the plurality of data bits in the data bit pattern and its inverse, and configured to output one of the associated one of the plurality data bits or its inverse according to a preprogrammed bit altering scheme, the output of each of the plurality of multiplexers being combined to form an altered data bit pattern, wherein the plurality of multiplexers are implemented in a least one of a hardware device, discrete logic device, or a software device, wherein the hardware device is at least one of a field-programmable gate array, or an application specific integrated circuit; and A storage device coupled to the interface and configured to store the altered data bit pattern.

2. An apparatus as defined in claim 1, wherein the preprogrammed bit altering scheme is based upon at least one of a serial number or a random number.

3. An apparatus as defined in claim 1, wherein the plurality of multiplexers are each further configured to receive, from the storage device, an associated one of the plurality of data bits in the altered data bit pattern and its inverse, and configured to select one of the data bits in the altered data bit pattern or its inverse according to the preprogrammed bit altering scheme, the output of each of the plurality of multiplexers being combined to restore the data bit pattern.

4. An apparatus as defined in claim 1, further comprising a second plurality of multiplexers, each configured to receive each of the data bits in the altered data bit pattern and to select a unique one of the data bits in the altered data bit pattern according to a preprogrammed bit scrambling scheme to output an altered and scrambled bit pattern, and wherein the storage device is configured to store the altered and scrambled bit pattern.

5. An apparatus for storing and retrieving digital video data, comprising:

An interface couple to a system bus and configured to receive from the system bus a plurality of data bits arranged in a data bit pattern;

A plurality of multiplexers, each configured to receive from the interface each of the plurality of data bits in the data bit pattern and to select a unique one of the data bits according to a preprogrammed bit scrambling scheme, the output of each of the plurality of multiplexers being combined to form an scrambled data bit pattern;

A second plurality of multiplexers, each configured to receive an associated one of the plurality of data bits in the scrambled data bit pattern and its inverse, and configured to output one of the associated one of the plurality of data bits or its inverse according to preprogrammed bit altering scheme, the output of each of the second plurality of multiplexers being combined to form a scrambled and altered data bit pattern, and a storage device coupled to the interface and configured to store the scrambled data bit pattern.

6. An apparatus as defined in claim 5, wherein the plurality of multiplexers and the second plurality of multiplexers are implemented in at least one of a hardware device, discrete logic device, or a software device.

7. An apparatus as defined in claim 6, wherein the hardware device is at least one of a field-programmable gate array, or an application specific integrated circuit.

8. An apparatus as defined in claim 5, wherein the preprogrammed bit scrambling scheme is based upon at least one of a serial number or a random number.

9. An apparatus as defined in claim 5, wherein the second plurality of multiplexers are each further configured to receive, from the storage device, an associated one of the plurality of data bits in the scrambled and altered data bit pattern and its inverse, and configured to select one of the data bits in the scrambled and altered data bit pattern or its inverse according to the preprogrammed bit altering scheme, the output of each of the second plurality of multiplexers being combined to restore the scrambled data bit pattern, and wherein the plurality of multiplexers are each further configured to receive each of the plurality of data bits in the scrambled data bit pattern and to select a unique one of the data bits according to the preprogrammed bit scrambling scheme, the output of each of the plurality of multiplexers being combined to restore the data bit pattern.

10. A method for storing and retrieving digital data within a storage device, the method comprising:

receiving data bits across a bus, the data bits forming a bit pattern;

inputting into at least one multiplexer, an associated one of the data bits and its inverse for each of the data bits forming the bit pattern;

altering the bit pattern of the data bits to form an altered bit pattern by selecting one of the associated one of the data bits or its inverse for each of the data bits forming the bit pattern based upon a preprogrammed data altering scheme to form the altered bit pattern;

storing the altered bit pattern;

restoring the altered bit pattern to the bit pattern by inputting into the multiplexer, an associated one of the altered data bits and its inverse for each of data bits in the altered bit pattern, and selecting one of the associated one of the altered data bits or its inverse based upon the preprogrammed data altering scheme; and outputting the restored data bits.

11. A method according to claim 10, wherein the altering and the restoring are performed by one of a discrete logic device, a software device, a field-programmable gate array, or an application specific integrated circuit.

12. A method according to claim 10, wherein the altering and the restoring are unique to the storage device.

13. A method according to claim 10, wherein the preprogrammed data altering scheme is based upon at least one of a serial number or a random number generator.

14. A method according to claim 10, further comprising:

scrambling the altered data bits prior to storing to form an altered and scrambled bit pattern by inputting into at least one second multiplexer each of the data bits forming the altered bit pattern and selecting a unique one of the altered data bits according to a preprogrammed bit scrambling scheme to form an altered and scrambled bit pattern;

storing the altered and scrambled bit pattern; and restoring the altered and scrambled bit pattern to the altered bit pattern by inputting into the at least one second multiplexer each of the altered and scrambled data bits and selecting a unique one of the altered and scrambled data bits according to the preprogrammed bit scrambling scheme to form the altered bit pattern.

15. A method for storing and retrieving digital data within a storage device, the method comprising:

receiving data bits across a bus, the data bits forming a bit pattern;

inputting into at least one multiplexer, each of the data bits forming the bit pattern;

scrambling the bit pattern to form a scrambled bit pattern by selecting a unique one of the data bits in each of the at least one multiplexer based upon a preprogrammed data scrambling scheme to form the scrambled bit pattern;

altering the scrambled data bit pattern to form a scrambled and altered bit pattern by inputting each of the data bits of the scrambled bit pattern and its inverse into an associated one of at least one second multiplexer and selecting one of the data bits or its inverse based upon a preprogrammed data altering scheme to form a scrambled and altered data bit pattern;

storing the scrambled and altered data bit pattern;

restoring the scrambled and altered data bit pattern to the scrambled bit pattern by inputting into the at least one second multiplexer an associated one of the data bits of the altered and scrambled data pattern and its inverse, and selecting data bits of the altered and scrambled data pattern or its inverse according to the preprogrammed bit altering scheme to form the scrambled bit pattern;

restoring the scrambled bit pattern to the bit pattern by inputting into the at least one multiplexer, each of the data bits of the scrambled bit pattern, and selecting a unique one of the data bits of the scrambled bit pattern based upon the preprogrammed data scrambling scheme; and outputting the restored data bits.

16. A method according to claim 15, wherein the scrambling, the altering, and the restoring are performed by one of a discrete logic device, a software device, a field-programmable gate array, or an application specific integrated circuit.

17. A method according to claim 15, wherein the scrambling, the altering, and the restoring are unique to the hardware platform.

18. A method according to claim 15, wherein the preprogrammed data scrambling scheme is based upon at least one of a serial number or a random number generator.

* * * * *